(No Model.)

S. MOORE.
CHUCK.

No. 310,303. Patented Jan. 6, 1885.

Witnesses:
Albert L. Bodwell
Nathan H. Inman

Samuel Moore Inventor.
By Henry Marsh Jr.
Attorney.

UNITED STATES PATENT OFFICE.

SAMUEL MOORE, OF PROVIDENCE, RHODE ISLAND, ASSIGNOR OF ONE-FOURTH TO JAMES B. RICHARDSON, OF SAME PLACE.

CHUCK.

SPECIFICATION forming part of Letters Patent No. 310,303, dated January 6, 1885.

Application filed December 12, 1883. (No model.)

*To all whom it may concern:*

Be it known that I, SAMUEL MOORE, a citizen of the United States, residing at Providence, in the county of Providence, in the State of Rhode Island, have invented a new and useful Universal Chuck, of which the following is a specification.

My invention consists of a chuck which is formed in three parts—a body, and cap, and interposed ring, said ring being provided with an internal gear and cams, and being actuated to open and close the chuck-jaws by a worm engaging said gear.

The objects of my invention are to provide a chuck adapted to hold tools or work of varying thickness, which shall be of simple construction, sure in movement, and certain and firm in its grip of the tool or work. I attain these objects by the mechanism illustrated in the accompanying drawings, in which—

Figure 1:
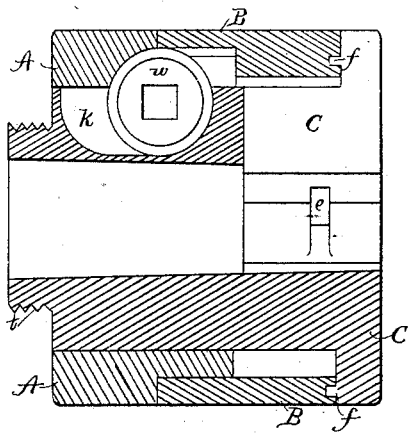
Figure 2:
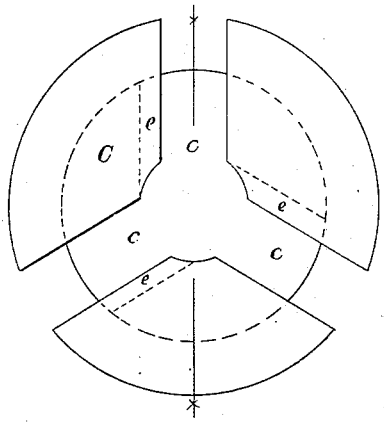
Figure 3:
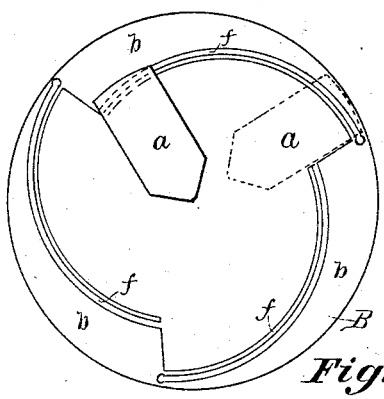
Figure 4:
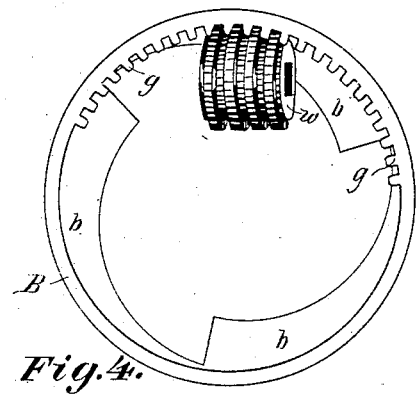
Figures 6, 7:
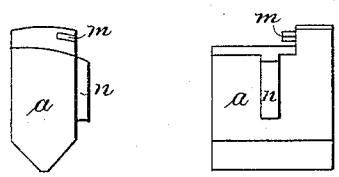
Figure 5:
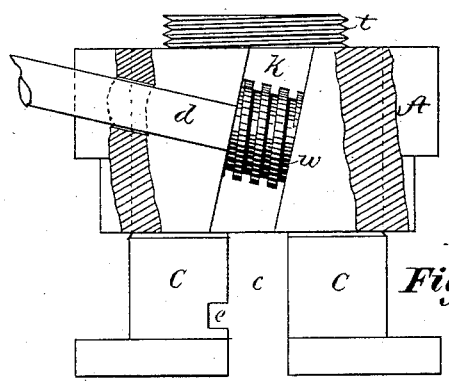

Figure 1 is a longitudinal central section on line *x x*. Fig. 2 is a face view. Fig. 3 is a face view of the ring, showing the cams and the relation of the jaws thereto. Fig. 4 is a rear view of the ring B, with its cams and worm. Fig. 5 is an elevation, a part of the chuck being broken off and removed to show the detail of the worm and its operating-wrench. Figs. 6 and 7 are face and side views of the jaw.

Similar letters refer to similar parts in all the drawings.

The body C, cap A, and revolving annular ring B constitute the exterior of the chuck. The part C is provided with channel-ways *c c c* and guideways *e e e*, in which work, respectively, the jaws *a a a* and their guide-lugs *n*. The ring B is provided with the internal cam-shaped flanges *b b b*, which are grooved at *f f f*. On the interior of the annular ring B is cut the gear *g*, extending partly around the inner circumference of said ring, as shown, in the rear of the cams. In this gear *g* the worm *w* operates to revolve the ring B. The cap A is shouldered to fit within the ring B, and is diagonally slotted or recessed on one side, as is also the body C, to form a chamber, *k*, for the worm *w*. The cap A is also provided with an orifice at right angles to the chamber *k* to admit of the introduction of a wrench, *d*, to operate the worm. The body C and cap A are secured together so as to allow the ring B to revolve between them responsive to the action of the worm *w* upon the gear *g*. The body C and cap A are secured together, in this instance, by screws tapped in longitudinally on the rear of the chuck in the joint between the cap and body, so that the body of the screws will extend partly into the body C and partly into the cap A; or the screws may be tapped laterally into the cap A and body C. The purpose to be attained is simply to secure the body C and cap A firmly together, so as at the same time to allow the ring B to revolve freely responsive to the action of the worm *w* in the gear *g*. The jaws *a* are provided with teats *m*, which engage with the groove *f* in the cam *b*, and as the ring B is revolved by the worm *w* acting in the gear *g*, it is obvious that the jaw *a* will move along the cam toward or from the center of the chuck, as the case may be; and also that in retracting the jaw *a* the force is exerted, through the teat *m* acting in the groove *f*, directly on the top of the jaw and in the line of its movement. In Fig. 3 are shown the two extreme positions of the jaw *a*. Practically, the several parts being constructed as described, I insert the jaws *a* in the channel-ways *c*, so that their lateral guide-lugs *n* will engage the slots *e*. I then place the ring B in position, so that the teats *m* will engage the grooves *f*. I then place the worm *w*, and place the cap A over it, and secure the cap and body together, the worm *w* then lying in its chamber *k*, partly in the body C and partly in the cap A. Then by inserting the wrench *d* to engage the worm *w* and turning it the ring B is revolved and the jaws *a* made to approach or recede from the center, as desired.

I claim and desire to secure by Letters Patent—

The combination of the body C, provided with channel-ways *c c c* and guiding-slots *e e e*, as shown, a ring, B, provided with internal cams, *b b b*, and an internal gear, *g*, as shown, with a cap, A, and a worm, *w*, contained within the recess *k*, extending partly into the cap A and partly into the body C, said worm engaging the internal gear, *g*, to operate the ring B.

SAMUEL MOORE.

Witnesses:
HENRY MARSH, Jr.,
JAMES B. RICHARDSON.